United States Patent [19]

Shaffer

[11] Patent Number: 5,143,591
[45] Date of Patent: Sep. 1, 1992

[54] METHOD OF PRODUCING ULTRA STABLE ALUMINUM OXIDE FOR HIGH VOLT ELECTROLYTIC CAPACITORS AND PRODUCT THEREOF

[75] Inventor: Jesse S. Shaffer, Columbia, S.C.

[73] Assignee: U.S. Philips Corporation, New York, N.Y.

[21] Appl. No.: 714,121

[22] Filed: Jun. 11, 1991

[51] Int. Cl.$^5$ .............................................. C25D 11/04
[52] U.S. Cl. .................................. 205/50; 205/153; 205/175; 205/213; 205/332
[58] Field of Search ...................... 204/27, 33, 58, 42; 205/50, 153, 172, 175, 213, 332; 428/472.2

[56] References Cited

U.S. PATENT DOCUMENTS

| | | | |
|---|---|---|---|
| 2,052,571 | 9/1936 | Karnes | 33/240 |
| 4,437,955 | 3/1984 | Shaffer | 204/129.4 |
| 4,481,084 | 11/1984 | Chen et al. | 204/42 |

FOREIGN PATENT DOCUMENTS 761196 11/1956 United Kingdom .

*Primary Examiner*—John Niebling
*Assistant Examiner*—William T. Leader
*Attorney, Agent, or Firm*—Norman N. Spain

[57] ABSTRACT

The invention relates to a method of producing aluminum capacitor foil adapted for use in high voltage AC motor start capacitors. Aluminum foil is electrolytically etched in a hot aqueous solution of sodium cloride and then immersed in a hot solution of nitric acid. The foil is immediately thereafter passivated in a dilute aqueous solution of phosphoric acid. The passivated foil is electrolytically treated at a first voltage of at least 150 but not greater than 250 volts in a solution of an ammonium salt of a phosphate, a silicate or a vanadinate to substantially reduce the leakage current, and further electrolytically treated at a second voltage of a magnitude about twice that of the first voltage in a solution of an ammonium salt of an aliphatic dicarboxylic acid of at least 9 carbon atoms and ammonium phosphate until an essentailly amorphous oxide is formed on the foil.

10 Claims, No Drawings

METHOD OF PRODUCING ULTRA STABLE ALUMINUM OXIDE FOR HIGH VOLT ELECTROLYTIC CAPACITORS AND PRODUCT THEREOF

BACKGROUND OF THE INVENTION

The invention in this case relates to an aluminum capacitor foil and to a method for producing such a foil. More particularly, the invention relates to an aluminum electrolytic capacitor foil particularly adapted for use in high voltage AC motor start capacitors and to a method for producing such a foil.

For use in high voltage single section AC motor start capacitors it is desired that the capacitor foil employed exhibit the lowest possible power factor combined with a high capacitance. In addition the structure of the foil should be such that the capacitor employing such a foil be capable of continuous duty (with AC voltage applied) for extended periods, (for example, up to 30 minutes or more).

British Patent Specification 761,196 shows the preparation of aluminum capacitor foil in which an etched aluminum foil is guided first through a forming bath in which forming voltage of 200 volts is employed and then through a forming bath in which a forming voltage of 400 volts is employed. Finally the foil is guided through a compensating bath in which a voltage of 400 to 550 volts is employed. This British Specification is silent about the composition of the bath and also does not suggest that the foil would be useful in high voltage motor start capacitors.

U.S. Pat. No. 2,052,575 shows a method of forming capacitor foils for electrolytic capacitors in which the foil, after cleaning with hot water acidified with a small amount of an acid such as phosphoric or boric acid after which the foil is electroformed in a solution of phosphoric acid. The foil is then washed to remove all traces of electrolyte and is then subjected to DC treatment in hydrolizable film forming electrolyte and then subjecting the foil to AC treatment in the same type of electrolyte, as a result of which a low power loss film is obtained. The resultant electrode is then washed to hydrolyze portions of electrolyte that are retained by the low power loss film and finally the electrode is subjected to a DC surge treatment in a cold film forming electrolyte. This patent is silent about the power factor of the capacitors employing this electrode. In addition there is no suggestion in this patent of the use of the electrode formed therein for electrolytic capacitors employed as motor start capacitors particularly for high voltage use.

German Patent Specification 2,836,878 shows a two step forming process for an aluminum capacitor foil in which the capacitor foil is first formed in an electrolyte comprising citric acid, ammonia and phosphoric acid and then in an electrolyte of this composition but which in addition contains azelaic acid. This German patent teaches nothing about the use of the foil in motor start capacitors nor does it teach anything about the power factor of the foil.

U.S. Pat. No. 4,437,955 shows a method of producing aluminum capacitor foil exhibiting a good combination of capacitance and mechanical strength including the steps of pre-etching the foil in an electrolyte bath containing hydrochloric acid and at least one of phosphoric acid and nitric acid while being subjected to an AC current then, without removing the hydrochloric acid from the foil, etching the foil by immersing the foil in aqueous electrolyte bath containing sodium chloride and either sodium sulfate or boric acid while subjecting the foil to a DC current until the weight of the foil decreases by at least 7 mg/cm$^2$. Nothing is stated in this patent about the use of such a foil in motor start capacitors and nothing is stated about the power factor of the resultant foil.

SUMMARY OF THE INVENTION

An object of this invention is to provide an improved aluminum electrolytic capacitor foil having a highly stable amorphous aluminum oxide layer particularly adapted for use in high voltage AC motor start capacitors. Another object of this invention is to provide a method for producing such improved aluminum parts.

These and other objects of the invention will be apparent from the description that follows.

According to the invention, an improved aluminum electrolytic capacitor foil is produced by a method involving the following steps:

1) electrolytically etching essentially aluminum, pure aluminum, that is a foil having an aluminum content of at least 99.75% in a hot aqueous solution of 8-20% by weight of salt (NaCl) and then immersing the etched aluminum foil in a 4-10% solution of of nitric acid, 2) removing the foil from the nitric acid solution and then, immediately thereafter, passivating the foil by immersing in a dilute aqueous solution of $H_3PO_4$, 3) then first electrifying the foil in a 0.05-1.0% by weight aqueous solution of an ammonium salt of a phosphate, silicate or vanadate, at a voltage of at least 150 but not greater than 250 volts until the leakage current is substantially reduced, and then further electrifying the foil at a second voltage that is about twice as high in an aqueous solution of about 0.01-1% by weight of an ammonium salt of an aliphatic dicarboxylic acid of at least 9 carbons or of a weak inorganic acid and about 0.005 to 0.01% by weight of ammonium phosphate until totally amorphous oxide layer is formed on the foil.

DETAILED DESCRIPTION OF THE INVENTION

As a result of the method of the invention, a highly stable, essentially amorphous oxide layer is formed on the aluminum foil. Due to the presence of this layer, an electrolytic capacitor employing such a foil exhibits the combination of a lower power factor and a high capacitance particularly at high voltages. Because of this, capacitors employing such a foil are particularly adapted for use as motor start capacitors.

Further due to the fact that the oxide layer produced is essentially amorphous resulting in a single section rather than a two section capacitor, a significant reduction in the size of the capacitor is achieved. This results in a significant savings in the cost of the capacitor.

Preferably, the aluminum foil employed has an aluminum content of at least 99.88% and most preferably the aluminum content is greater than 99.90%, excellent results being achieved with an aluminum content of 99.90-99.95% by weight.

Preferably, the diluted solution of phosphoric acid contains 0.5-5% by weight of phosphoric acid.

While any ammonium salt of an aliphatic dicarboxylic acid of more than 9 carbons may be employed preferably the acid contains 9-12 carbons. An example of such an acid is azelaic acid. Particularly the use of dimethyl ammonium salt of azelaic acid has been found to produce excellent results.

Electrifying the passivated foil to about 200 volts in a solution of about 1% by weight of ammonium phosphate followed by further electrification to about 400 volts in a solution of about 1% by weight of dimethyl ammonium azelate and about 0.01% of ammonium phosphate results in the production of a practically amorphous oxide layer.

For a more complete understanding, the invention will now be described in greater detail with reference to the following example:

EXAMPLE

An aluminum foil of an aluminum content of 99.88-99.99% was etched at 90° C. in a 60-20% brine solution electrochemically to a 3-5 mg/cm$_2$ weight loss. The foil was then directly transferred to a 6-10% nitric acid bath held at 90°-95° C. The foil was then passivated immediately after emerging from the hot acid in a bath of 0.1% phosphoric acid at room temperature. After passivation, the foil was then electrified in a solution of 1% ammonium phosphate to 200 volts until the leakage current was reduced to less than 10 mA/cm$_2$. The foil was then further electrified to 400 volts in an aqueous solution containing 1% of dimethyl ammonium azelate and 0.1% ammonium phosphate. The oxide thus produced was found to be essentially entirely amorphous.

Electrolytic capacitors were produced using the foils produced according to the example and foils produced according to methods of the prior art. In these capacitors, the electrolyte employed had the following composition: ethylene glycol—51.7%, boric acid—27.00%, mannitol—9.00%, ammonium hydroxide—12.00%, 85% phosphoric acid—0.25%, all percentages by weight.

The power factor was determined for these capacitors at 150V, 205V and 330V.

The results are shown in the following Table in which AOC, ADC, SOC and SDC are electrolytic capacitors employing foils produced according to the prior art. EOC and EDC are capacitors employing foils produced according to the method of the example.

|       | % Power Factor | | |
|-------|------|------|------|
|       | 150 V | 202 V | 330 V |
| AOL   | 3.5  | 4.5  | 9.5  |
| ADL   | 3.5  | 4.9  | 7.0  |
| SOC   | 3.6  | 4.6  | 6.8  |
| SDC   | 3.8  | 4.5  | 6.5  |
| EOC   | 1.9  | 3.0  | 4.8  |
| EDC   | 1.9  | 3.0  | 4.3  |

As shown in this Table, the capacitors employing the field of the invention exhibit a significant improvement in an important property - percent power factor, particularly, when employed at high voltages.

What is claimed is:

1. A method of manufacturing an an essentially pure aluminum electrolytic capacitor foil particularly adapted for use in high voltage AC motor start capacitors, said method comprising:
    a) electrolytically etching aluminum foil of an aluminum content of at least 99.88% in a hot aqueous solution of 8-20% by weight of sodium chloride and then immersing the etched aluminum foil in a 4-10% solution of hot nitric acid,
    b) removing the etched aluminum foil from said hot nitric acid solution and then immediately thereafter immersing said foil in a dilute aqueous solution of $H_3PO_4$ to thereby passivate said foil;
    c) electrifying said passivated foil at a first voltage of at least 150 but not greater than 250 volts in a 0.05 to 1.0% solution by weight of an ammonium salt of a member selected from the group consisting of phosphates, silicates and vanadinates, until leakage current is substantially reduced;
    d) further electrifying said foil at a second voltage of about twice said first voltage in a solution of 0.01 to 1.0% by weight of an ammonium salt of an aliphatic dicarboxylic acid of at least 9 carbons and 0.005 to 0.01% by weight of ammonium phosphate until an essentially amorphous oxide layer is formed on said foil.

2. The method of claim 1 wherein the foil is first electrified until the leakage current is reduced to less than 10 mA/cm$^2$.

3. The method of claim 1 wherein the aluminum content of the foil prior to etching is about 99.90%-99.95%.

4. An aluminum electrolytic capacity foil manufactured by the method of claim 1, said foil being provided with an essentially entirely amorphous layer of aluminum oxide.

5. A method of manufacturing an aluminum electrolytic capacitor foil particularly adapted for use in high voltage AC motor start capacitors, said method comprising:
    a) electrolytically etching aluminum foil of an aluminum content of at least 99.88% in a hot aqueous solution of 8-20% by weight of sodium chloride and then immersing the etched aluminum in a 4-10% solution of hot nitric acid,
    b) removing the etched aluminum foil from said hot nitric acid solution and then immediately thereafter immersing said foil in an aqueous solution of 0.5-5% by weight of $H_3PO_4$ to thereby passivate said foil;
    c) electrifying said passivated foil at a first voltage of at least 190 but not greater than 200 volts in a 0.05 to 1.0% solution by weight of an ammonium salt of a member selected from the group consisting of phosphates, silicates and vanadinates, until leakage current is substantially reduced;
    d) further electrifying said foil at a second voltage of about twice said first voltage in a solution of 0.01 to 1.0% by weight of an ammonium salt of an aliphatic dicarboxylic acid of at least 9 carbons and 0.005 to 0.01% by weight of ammonium phosphate until an essentially amorphous oxide layer is formed on said foil.

6. The method of claim 5 wherein the salt of the aliphatic dicarboxylic acid is an ammonium salt of an aliphatic dicarboxylic acid of 9 to 12 carbons.

7. The method of claim 5 wherein said passivated foil is first electrified to about 200 volts in a solution of about 1% by weight ammonium phosphate.

8. The method of claim 7 wherein after the electrification to about 200 volts the foil is further electrified to about 400 volts in a solution of about 1% by weight dimethyl ammonium azelate and about 0.01% by weight of ammonium phosphate.

9. The method of claim 5 wherein the foil is first electrified until the leakage current is reduced to less than 10 mA/cm$^2$.

10. The method of claim 5 wherein the aluminum content of the foil prior to etching is about 99.90%-99.95% by weight.

* * * * *